United States Patent
Hjelmstrom (10) Patent No.: US 9,204,058 B2
(45) Date of Patent: Dec. 1, 2015

(54) METHOD AND APPARATUS FOR SETTING A CAMERA EXPOSURE TIME

(71) Applicant: Axis AB, Lund (SE)

(72) Inventor: Jonas Hjelmstrom, Staffanstorp (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/300,721

(22) Filed: Jun. 10, 2014

(65) Prior Publication Data

US 2015/0002732 A1   Jan. 1, 2015

(30) Foreign Application Priority Data

Jun. 27, 2013   (EP) ..................................... 13174006

(51) Int. Cl.
*H04N 5/235* (2006.01)
(52) U.S. Cl.
CPC .................................. *H04N 5/2353* (2013.01)
(58) Field of Classification Search
CPC . H04N 1/0048; H04N 1/00477; H04N 5/351; G03B 2217/18; G03B 17/20; G03B 7/00; G03B 39/00
See application file for complete search history.

(56) References Cited

U.S. PATENT DOCUMENTS

| | | | |
|---|---|---|---|
| 5,754,223 A * | 5/1998 | Palmos | 348/207.99 |
| 2008/0024619 A1 | 1/2008 | Ono | |
| 2009/0322895 A1 | 12/2009 | Miyata | |
| 2010/0066842 A1* | 3/2010 | Narasimha et al. | 348/208.4 |
| 2010/0066853 A1 | 3/2010 | Aoki et al. | |
| 2010/0225801 A1 | 9/2010 | Takahashi | |
| 2011/0096202 A1 | 4/2011 | Lee | |
| 2012/0169840 A1 | 7/2012 | Yamashita et al. | |
| 2013/0010171 A1 | 1/2013 | Miyata | |
| 2013/0141524 A1 | 6/2013 | Karunamuni et al. | |

FOREIGN PATENT DOCUMENTS

| | | |
|---|---|---|
| EP | 2 141 913 A2 | 1/2010 |
| EP | 2 479 976 A1 | 7/2012 |
| JP | 2012-253475 | 12/2012 |

OTHER PUBLICATIONS

European Search Report issued Apr. 1, 2014, in European Application No. 13174006.0 filed Jun. 27, 2013.
Search Report issued Apr. 10, 2013 by World Patent Technology WPT AB.

* cited by examiner

*Primary Examiner* — Mekonnen Dagnew
(74) *Attorney, Agent, or Firm* — Oblon, McClelland, Maier & Neustadt, L.L.P.

(57) ABSTRACT

A method for setting a camera exposure time of a camera is disclosed. A moving indicator is overlaid in a video sequence of images. The speed of the moving indicator corresponds to an exposure time below which objects that move at an angular speed which is slower than the indicator will be imaged by the camera as sharp. The speed of the moving indicator is adjusted such that it moves at the same speed as a moving object in the video sequence of images. The camera exposure time is then set based on the exposure time that corresponds to the speed of the moving indicator after the speed adjustment.

10 Claims, 6 Drawing Sheets

METHOD AND APPARATUS FOR SETTING A CAMERA EXPOSURE TIME

TECHNICAL FIELD

The present invention relates to the field of exposure times of cameras. In particular it relates to a method for setting a camera exposure time.

BACKGROUND

In a surveillance scene with moving objects, such as cars on a highway, it is important to have a correct exposure time. If the exposure time is too long the image and video will become blurry because the objects are moving too fast in relation to the time when light from the scene is collected.

The relation between exposure time and object speed is e.g. known from US2011096202 A1 which discloses overlaying graphical objects, such as snowflakes, autumn leaves or similar, on an image of a scene. The user can adjust the speed of the graphical objects by changing the shutter speed.

A problem which is not addressed in US2011096202 A1 is however how to select an appropriate exposure time. There are many factors that influence the choice of an exposure time, thereby making it difficult to give advice to an operator for how to set the exposure time. There is thus a need for a method which helps an operator in selecting an appropriate exposure time for imaging of moving objects.

SUMMARY OF THE INVENTION

In view of the above, it is thus an object of the present invention to provide a method and an apparatus for helping an operator in selecting an appropriate exposure time for imaging of moving objects.

According to a first aspect of the invention, the above object is achieved by a method for setting a camera exposure time of a camera, comprising:

receiving a video sequence of images of a scene in which there is a moving object;

overlaying a moving indicator in the video sequence of images, wherein the speed of the moving indicator corresponds to an exposure time below which objects that move at an angular speed which is slower than the indicator will be imaged by the camera with a sharpness being above a certain sharpness level;

receiving an input to adjust the speed of the moving indicator such that it moves at the same speed as the moving object in the video sequence of images;

setting the camera exposure time based on the exposure time that corresponds to the speed of the moving indicator after the speed adjustment.

With the above method an indicator is thus overlaid in, i.e. shown together with, the video sequence. The speed of the indicator is adjusted to match the speed of a moving object. The speed of the indicator corresponds to an exposure time in such a way that objects that move at an angular speed which is lower than the speed of the indicator will be imaged as sharp by the camera when using the corresponding exposure time. Consequently, the adjusted speed of the indicator corresponds to an exposure time for which the moving object (and any object moving slower than the moving object) will be imaged as sharp by the camera. The relation between the speed of the moving indicator and the exposure time may for example be described by a function or a table. By setting the camera exposure time based on the exposure time corresponding to the adjusted speed of the overlaid indicator one may thus assure that the moving object will be imaged as sharp.

The above method is further advantageous in that it is simple and flexible since it allows an operator to set the camera exposure time by simply adjusting the speed of a graphical indicator overlaid in a video sequence to match the speed of objects in the video sequence.

With respect to the speed of the moving object, the relevant quantity to consider is the angular speed of the moving object relative to the camera. For example, consider a first object which is far away from the camera and which moves fast (in terms of meters per second) and a second object which is close to the camera and which moves slowly (in terms of meters per second). Although having different speeds in terms of meters per second, the first and the second object may still have the same angular speed. If so, the speed of the first and the second objects as seen in the video sequence (for example as measured in number of pixels per time unit) will be equal. Accordingly, the speed as seen in the video sequence corresponds to the angular speed of the objects.

In the context of the application, the word "sharp" should be interpreted in connection to a tolerance level, herein referred to as a certain sharpness level. If the sharpness of an image or part of an image captured by the camera is above the tolerance level, the image or the part of the image captured by the camera is considered to be sharp. In particular, if the sharpness of the image is above the tolerance level it will be perceived as sharp by a user.

If there is a plurality of moving objects in the video sequence, the speed of the moving indicator may be adjusted to match the speed of any of the plurality of moving objects. For example, if there are cars and persons in the same video sequence, the operator may choose to match the speed of the moving indicator to that of a person if persons are the important thing to study in the video sequence. However, if the speed of the moving indicator moves slower than the fastest moving object in the video sequence of images, the user will probably end up with images that are blurry when using the exposure time corresponding to the speed of the indicator. Therefore, it may be particularly advantageous to adjust the speed of the indicator after the fastest moving object since then all objects that move at an angular speed which is slower than the fastest moving object will be imaged as sharp in the video sequence. Thus, when there are a plurality of moving objects in the video sequence of images, the step of receiving an input to adjust the speed of the moving indicator may comprise receiving an input to adjust the speed of the moving indicator such that it moves at the same speed as the fastest moving object in the video sequence of images.

The position and/or the orientation of the moving indicator may be adjustable, for instance by an operator. For example the moving indicator may move horizontally, vertically or at any other angle. In this way, the moving indicator may be adjusted to move in the same direction as the moving object in view of which the speed of the moving indicator is adjusted.

Generally, the moving indicator may take any form which is suitable for the above purposes. The moving indicator may for instance be a line. The orientation of the line may for example be perpendicular to the direction of motion of the moving object. The moving line may be introduced together with, i.e. overlaid in, the video sequence of images when displayed on a screen or monitor.

According to another example, the moving indicator may be in the form of a plurality of lines or shapes which are moving across the image. The lines may for example be parallel or beam-shaped and move at the same speed across the image. The speed of the lines or the shapes may then be adjusted until the moving object stays between two of the lines/shapes.

In some situations the moving object is moving towards or away from the camera. If so, the moving object looks as if it is growing or shrinking in the video sequence of images. In order to capture the growing/shrinking motion of the moving object, it may be advantageous if the indicator is an object having a shape the dimensions of which changes at a speed which is adjustable. In this way, the speed of change of the dimensions of the moving indicator may be adjusted to match the speed of growth/shrinkage of the moving object. The speed of change of the moving object thus correlates to the speed of growth/shrinkage of the moving object.

For example the indicator may be a circle having a radius which changes, i.e. increases or decreases depending on whether the object moves towards or away from the camera, at a speed which is adjustable. However, also other types of objects may be used. For example, if the moving objects are cars, a moving indicator having a periphery which has the shape of a car could be used to simplify the speed matching.

The step of setting the camera exposure time may comprise setting the camera exposure time to be shorter or equal to the exposure time that corresponds to the speed of the moving indicator after the speed adjustment. In this way, the exposure time that corresponds to the speed of the moving indicator after the speed adjustment serves as a maximum exposure time in the sense that it is the maximal exposure time to be used in order for the moving object to be imaged as sharp by the camera.

If the camera exposure is set to the exposure time that corresponds to the speed of the moving indicator after the speed adjustment, i.e. to the maximum exposure time as outlined above, the moving object will be imaged as sharp. However, there are also other factors which influence the choice of exposure time, such as the light conditions around the camera. If the light condition around the camera is very bright it may be advantageous to set a shorter camera exposure time in order to avoid overexposure. Thus, the camera exposure time may be set to be shorter than the exposure time that corresponds to the speed of the moving indicator after the speed adjustment. In this way the moving object will be imaged as sharp at the same time as overexposure is avoided.

An alternative to shorten the exposure time is to zoom out since this decreases the angular speed of the objects and a longer exposure may be used. For example, the camera exposure time may be set to the maximum exposure time with respect to a first zoom level, and then the camera may zoom out to a second zoom level. Specifically, when the camera has a zoom functionality and the exposure time that corresponds to the speed of the moving indicator after the speed adjustment is associated with a first zoom level of the camera, the method may further comprise setting the camera exposure time to the exposure time associated with the first zoom level, and zooming out to a second zoom level. This is particularly advantageous at low light conditions.

According to a second aspect of the invention, the above object is achieved by an apparatus for setting a camera exposure time, comprising:

a receiver configured to receive from the camera a video sequence of images of a scene in which there is a moving object;

a processing unit configured to overlay a moving indicator in the video sequence of images, wherein the speed of the moving indicator corresponds to an exposure time below which objects that move at an angular speed which is slower than the indicator will be imaged by the camera with a sharpness being above a certain sharpness level;

an input device configured to receive input regarding an adjustment of the speed of the moving indicator such that it moves at the same speed as the moving object in the video sequence of images;

wherein the processing unit is further configured to set the camera exposure time based on the exposure time that corresponds to the speed of the moving indicator after the speed adjustment.

According to a third aspect of the invention, the above object is achieved by a computer-readable medium comprising computer code instructions which are adapted to perform any method of the first aspect when run in a device having processing capabilities.

The second aspect and third aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, object, step etc.]" are to be interpreted openly as referring to at least one instance of said device, object, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The systems and devices disclosed herein will be described during operation.

Figure 1:
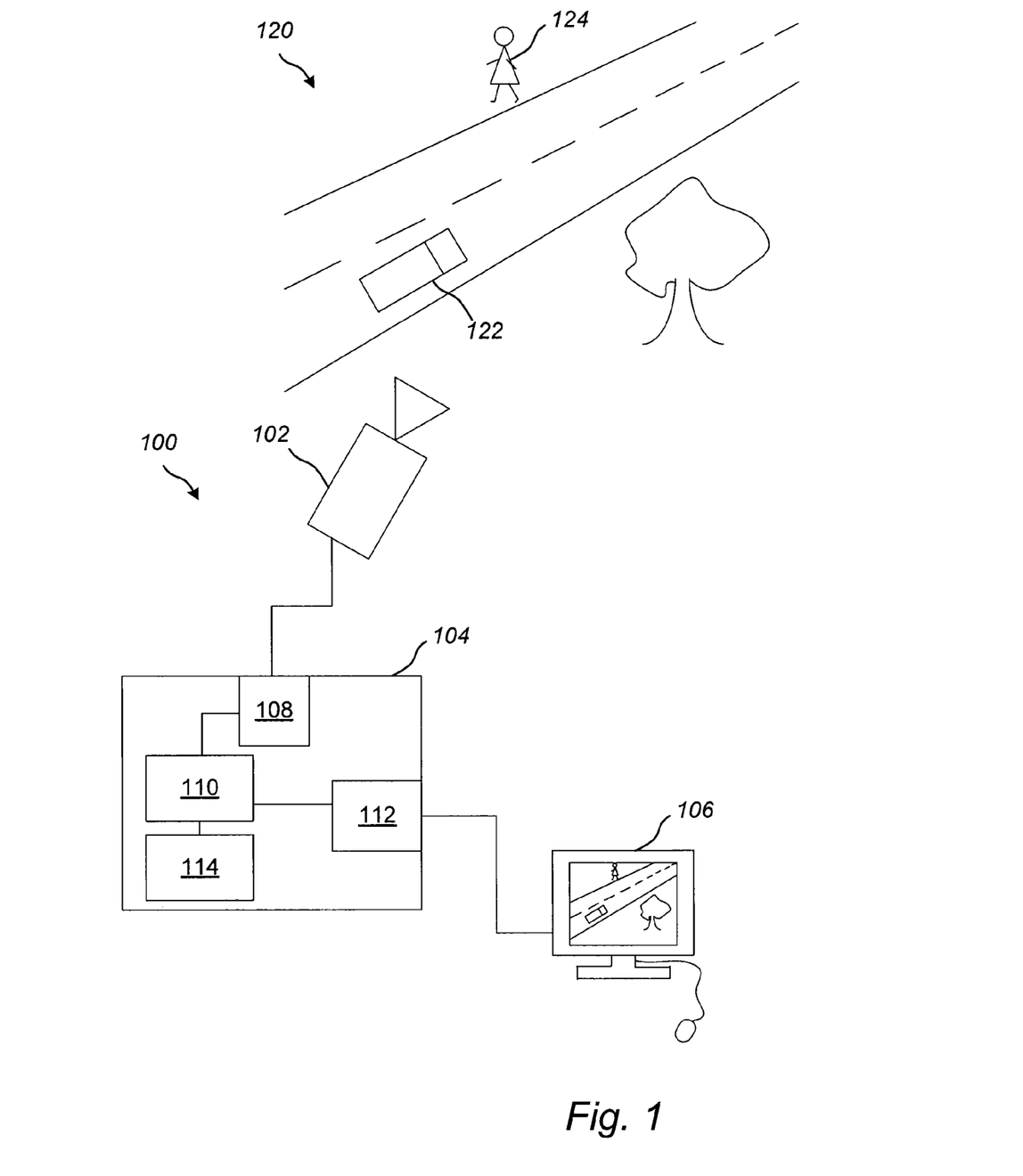
FIG. 1 is a schematic illustration of a system including an apparatus for setting a camera exposure time according to an embodiment.

FIG. 1 illustrates a system 100. The system comprises a camera 102, an apparatus 104 for setting an exposure time of the camera 102, and a user interface 106 comprising a display.

The camera 102 may capture images, e.g. of a scene 120, using an exposure time. In particular, the camera 102 may capture a video sequence of images of the scene 120. The exposure time of the camera 102 may be set, for example by the apparatus 104, and is thus variable. Any such camera 102 known in the art may be used. The scene 120 may comprise moving objects 122, 124, here illustrated by a car 122 driving on a road and a person 124 walking along the road. If the exposure time is too long, there is a risk that the images captured by the camera 102 will be blurry since the objects 122, 124 are moving too fast in relation to the time when light is collected by the camera 102. Thus, the exposure time should be set taking the motion of the objects 122, 124 into account.

The exposure time setting apparatus 104 is connected to the camera 102. The exposure time setting apparatus 104 is further connected to the user interface 106. The exposure time setting apparatus 104 comprises a receiver 108, a processing unit 110 and an input device 112. The exposure time setting apparatus may further comprise a memory 114. The apparatus 104 may receive video sequences of images from the camera 102 via the receiver 108. The apparatus 104 may display the received video sequence of images on the user interface 106. Further, the apparatus 104 may via the input device 112 receive various kinds of input, such as user input, relating to different adjustment to be made in relation to the camera 102 and the video sequence of images captured by the camera 102. For example, a user may input commands via the user interface 106. The processing unit 110 is in communication with the receiver 108 and the input device 112 so as to receive and process data received by the receiver 108 and the input device 112.

The memory 114 may be any kind of storage medium known in the art. For example the memory 114 may serve as a non-tangible computer-readable medium which may store computer code instructions to be executed by the processing unit 110. The memory 114 may further serve as a long-term or short-term storage of data relating to settings of the camera 102 or video sequences acquired by the camera 102.

Figure 9:
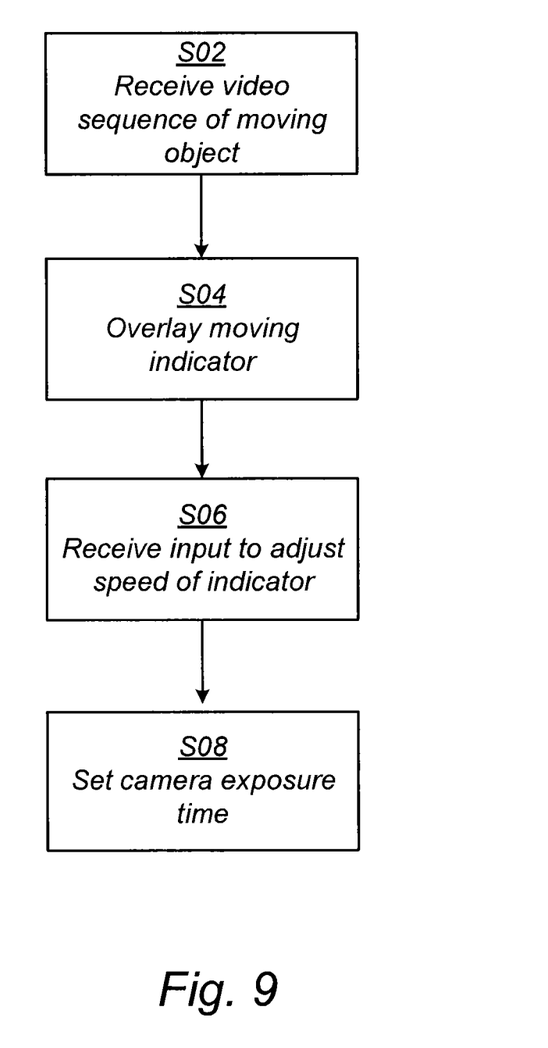
FIG. 9 is a flowchart of a method for setting a camera exposure time according to embodiments.

The operation of the apparatus 104 will now be described with reference to FIGS. 1-5 and the flowchart of FIG. 9.

In step S02 the apparatus 104, via receiver 108, receives a video sequence of images from the camera 102. The video sequence of images depicts a scene 120 in which there are moving objects 122, 124. The video sequence of images was acquired by the camera 102 using a first exposure time.

Figure 2:
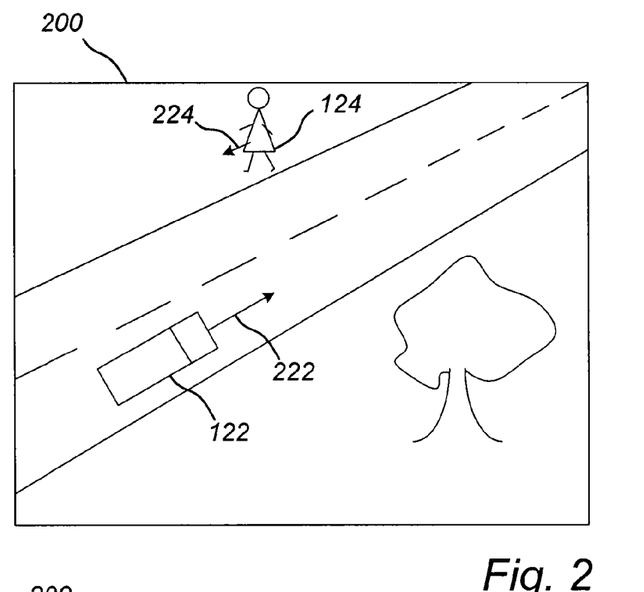
FIG. 2 is a schematic illustration of a video sequence of a scene comprising a moving object.

FIG. 2 schematically illustrates such a video sequence 200. The video sequence 200 in this case comprises two moving objects 122, 124 in the form of a car 122 and a person 124. For illustration purposes, the video sequence 200 is illustrated as a single frame and the motion of the objects 122 and 124 are indicated by arrows 222, 224. The direction and the length of the arrows 222, 224 represent the direction of motion and the speed of the moving objects 122, 124, respectively. In the illustrated example, the moving object 122 (the car) moves faster than the moving object 124 (the person). Also, the car 122 and the person 124 are moving in opposite directions.

The video sequence of images 200 is passed from the receiver 108 to the processing unit 110. The processing unit 108, in step S04, overlays a moving indicator 302 (see FIG. 3) in the video sequence of images 200. In this example, the moving indicator 302 is in the form of a line. However, as the skilled person realizes other types of graphical indicators could be used instead. The moving indicator 302 moves with a speed as indicated by the arrow 304.

Figure 3:
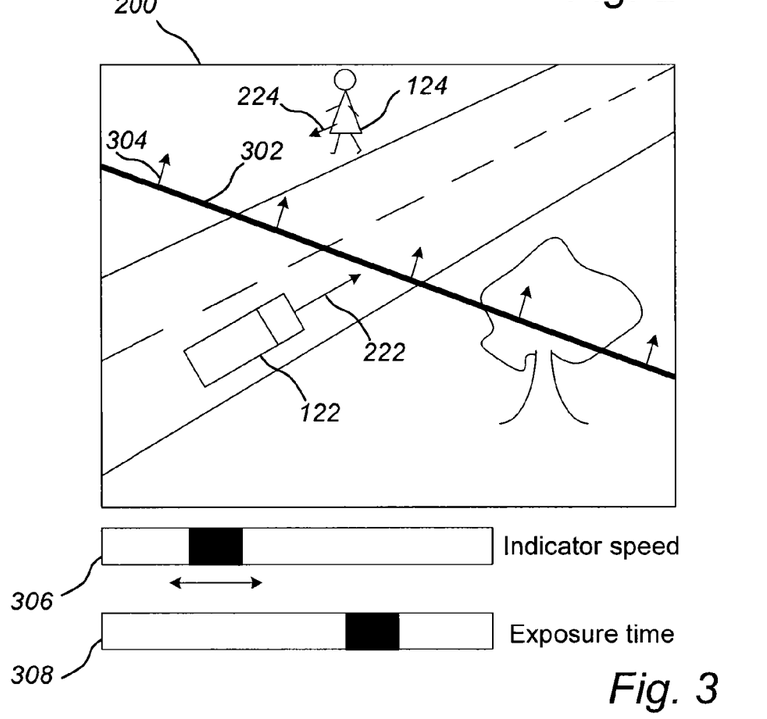
FIG. 3 shows the video sequence of FIG. 2 together with an overlaid moving indicator in accordance with embodiments.
Figure 4:
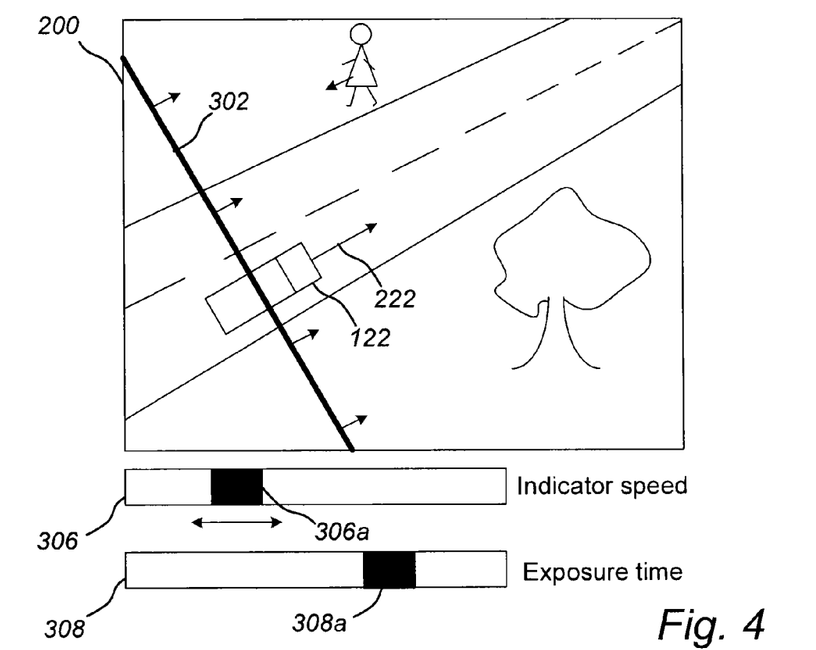
FIG. 4 shows the video sequence of FIG. 2 together with an overlaid moving indicator whose position and direction is adjusted in accordance with embodiments.
Figure 5:
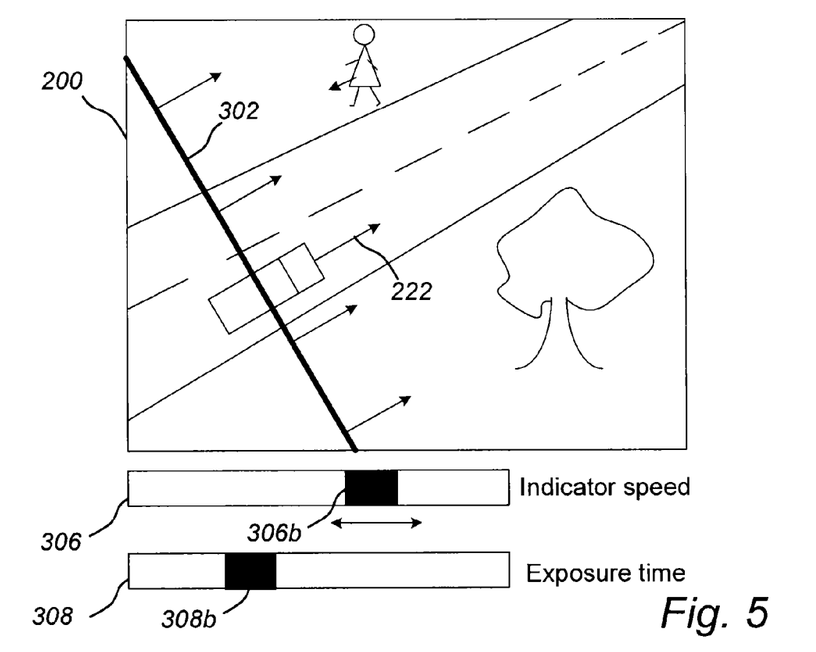
FIG. 5 shows the video sequence of FIG. 2 together with an overlaid moving indicator whose speed is adjusted in accordance with embodiments.

The speed of the moving indicator 302 corresponds to an exposure time of the camera 102 and vice versa. This will be explained in more detail in the following.

Consider a certain exposure time of the camera 102, such as the first exposure time used to acquire the video sequence 200. When acquiring images of moving objects 122, 124 using that certain exposure time, some moving objects 122, 124 may be imaged as sharp and some moving objects 122, 124 may be imaged as blurry depending on the speed of the moving objects. The higher the speed of the moving objects 122, 124, the shorter exposure time is required in order to image the moving objects 122, 124 as sharp. By way of example, using the certain exposure time the person 124 may be imaged as sharp while the car 122 may be imaged as blurry. In this context, the word "sharp" should be interpreted in connection to a tolerance level, herein referred to as a certain sharpness level. If the sharpness of an image or part of an image captured by the camera 102 is above the tolerance level, the image or the part of the image captured by the camera 102 is considered to be sharp. For the certain exposure time there will thus be a certain corresponding speed such that 1) objects that move at an angular speed which is faster than the certain corresponding speed will be imaged by the camera as blurry (i.e. the sharpness of the imaged object will be below the tolerance level), and 2) objects that move at an angular speed which is slower than the certain corresponding speed will be imaged by the camera as sharp (i.e. the sharpness of the imaged object will be above the tolerance level).

In accordance to the above, each exposure time thus corresponds to a certain speed and vice versa. In particular the speed of the moving indicator 302 is set to correspond to an exposure time in accordance to the above. By way of example, the speed 306a of the moving indicator 302 of FIG. 3 (as indicated by arrow 304) may correspond to the current exposure time of the camera 102, i.e. the first exposure time 308a which the camera 102 used to acquire the image sequence 200.

In the illustrated example of FIG. 3, the speed of the moving indicator 302 (length of the arrow 304) is lower than the speed of the car 122 (length of arrow 222) but higher than the speed of the person 124 (length of arrow 224). Thus, the person 124 will be imaged as sharp and the car 122 will be imaged as blurry. The current speed 306a of the moving indicator 302 is indicated by the indicator speed bar 306. Such a bar or similar means having the same functionality may for example be shown on the user interface 106. The exposure time 308a corresponding to the current speed 306a of the moving indicator 302 may be shown by an exposure time bar 308 or similar means on the user interface 106.

The exposure times and their corresponding speeds may be determined by performing calibration. A calibration data set may for example be constructed by capturing images of objects of different known speeds at different known exposure times. For each exposure time, the sharpness of the images may be analyzed in order to find out the maximum object speed which gives a sharp image. For example, two or three test video sequences could be captured with respect to objects that move at the same speed using different exposure times. Based on the test video sequences one could manually determine which exposure time gives rise to a sharp image of the objects. In this way, the speed of the objects may be associated with an exposure time. For instance, a calibration curve, such as a linear function (a line), may be fit to the calibration data set in order to associate each exposure time with a speed. The calibration result, which may be in the form of a table or parameters describing a curve or a function, may be stored in the exposure time setting apparatus 104, for example in the memory 114 such that it can be accessed by the processing unit 110. The calibration curve/function may thus be used by the processing unit 110 to map a speed of the moving indicator on an exposure time which will give rise to a sharp image of the object.

The position and/or the orientation of the moving indicator 302 overlaid in the video sequence 200 may be adjusted. By way of example, an operator may adjust the orientation of the moving indicator 302 by dragging it with a computer mouse so that it is appears at right angle with the direction of one of the moving objects 122, 124. For example, the processing unit 110 may receive input via input device 112 regarding an adjusted position and orientation of the moving indicator 302. Alternatively, the processing unit 110 may receive input regarding a particular moving object, such as the moving object 122, and the processing unit 110 may based on the particular moving object 122 determine a new position (e.g. corresponding to the position of the object 122) and a new orientation (e.g. based on the motion direction of the object 122) of the moving indicator 302. In response to the input, the processing unit 110 may adjust the position and orientation of the moving indicator 302. This is further illustrated in FIG. 4 where the position and orientation of the line 302 has been updated such that it is positioned at the moving object 122 (the car) and has an orientation which is perpendicular to the direction of motion of the moving object 122 as indicated by the arrow 222. In other words, the moving indicator 302 now moves in the same direction as the moving object 122.

The speed of the moving indicator 302 is adjustable. For example, the speed of the indicator 302 may be adjusted by a user, such as via the user interface 106, such that the speed of the moving indicator 302 matches the speed of one of the moving objects 122, 124 in the video sequence 200. In case there are several moving objects 122, 124 in the video sequence, the speed of the moving indicator 302 may for example be adjusted such that it matches the speed of the fastest moving object. In the illustrated example this corresponds to the car 122. By matching the speed of the moving indicator 302 with the fastest moving object 122, the exposure time corresponding to the speed of the moving indicator 302 is such that all moving objects 122, 124 will be imaged as sharp by the camera 102. For example, the speed may be adjusted via the indicator speed bar 306 on the user interface 106. Alternatively, the speed may be adjusted via the exposure time bar 308 due to the relation between the indicator speed and the exposure time of the camera 102.

In step S06, the exposure time setting apparatus 104 may thus receive, via input device 112, an input regarding an adjustment of the speed of the moving indicator 302 from the first speed 306a to a second speed 306b. The speed adjustment of the moving indicator 302 is then passed on to the processing unit 110. The processing unit 110 may adjust the speed of the moving indicator 302 in the video sequence 200. This is further illustrated in FIG. 4, where the speed of the moving indicator 302, as illustrated by the arrow 504, has been adjusted such that it matches the speed of the moving object 122 as illustrated by the arrow 222.

In step S08, the processing unit 110 proceeds to set a camera exposure time, i.e. to set an exposure time of the camera 102 to be used when acquiring future images. The processing unit 110 uses the speed 306b of the moving indicator 302 after the speed adjustment in order to set the camera exposure time. More specifically, the processing unit 110 finds out which exposure time 308b corresponds to the adjusted speed of the moving indicator 302. For example, the processing unit 110 may access from the memory 114 a curve, a function or a table created using calibration data in the form of test sequences as described earlier. The processing unit 110 then uses the exposure time corresponding to the adjusted speed as a basis for setting the camera exposure time.

According to one embodiment, the processing unit 110 sets the camera exposure time to be shorter or equal to the exposure time corresponding to the adjusted speed. In other words, the processing unit 110 may use the exposure time corresponding to the adjusted speed as a maximum exposure time. In this way, all moving objects 122, 124 that move slower than the adjusted speed of the moving indicator 302 will be imaged as sharp by the camera 102. In case the speed of the moving indicator 302 was matched to the speed of the fastest moving object, all moving objects 122, 124 will be imaged as sharp by the camera 102.

During bright light conditions the processing unit 110 may set the camera exposure time to be shorter than the exposure time 308b that corresponds to the adjusted speed 306b of the moving indicator 302. For example, the processing unit 110 may set the camera exposure time to offset from the exposure time 308b that corresponds to the adjusted speed 306b of the moving indicator 302 by an amount which depends on, i.e. as a function of, the current brightness around the camera 102.

In a low light situation, the processing 110 unit may increase the gain in order to adjust the exposure of the acquired images. However, this typically increases the noise level in the images. As an alternative, the processing unit 110 may override the exposure time 308b corresponding to the adjusted speed 306b of the moving indicator 302 and use a longer exposure time with the risk of getting blurry images.

The camera 102 may have a zoom functionality allowing it to acquire images at different zoom levels. Each zoom level may be associated with its own table, function or curve of corresponding exposure times/speeds. The relation between the corresponding exposure times/speeds for different zoom levels may also be described by a function. The relation is then possible to calculate when knowing the angle of view at the specific zoom level. By zooming in and out, the angular speed of moving objects in the images acquired by the camera 102 is affected. Specifically, by zooming out the angular speed of the moving objects decreases and longer exposure times may be used. Conversely, by zooming in, the angular speed of the moving objects increases and shorter exposure times should be used. Accordingly, an alternative to reducing the exposure time is to zoom out. This may for example be useful for depicting fast moving objects under low light conditions. Under such conditions a long exposure time is needed to allow enough light to enter the camera. At the same time, a short exposure time is needed to avoid blurry images due to the fast motion of the objects in the image. In order to set a camera exposure time under such conditions, the processing unit 110 may make use of the zoom functionality. More precisely, the video sequence 200 in which the moving indicator 302 is overlaid may be acquired at a first zoom level of the camera 102, and the speed of the moving indicator may be adjusted with respect to the first zoom level. The processing unit 110 may then determine an exposure time that corresponds to the adjusted speed of the moving indicator by for example consulting a table of corresponding exposure times/ speeds associated with the first zoom level. The camera 110 may then set the camera exposure time to the exposure time associated with the first zoom level, and zoom out to a second zoom level.

Another embodiment which is suitable for objects moving towards or away from the camera 102 will now be described with reference to FIG. 6-8.

Figure 6:
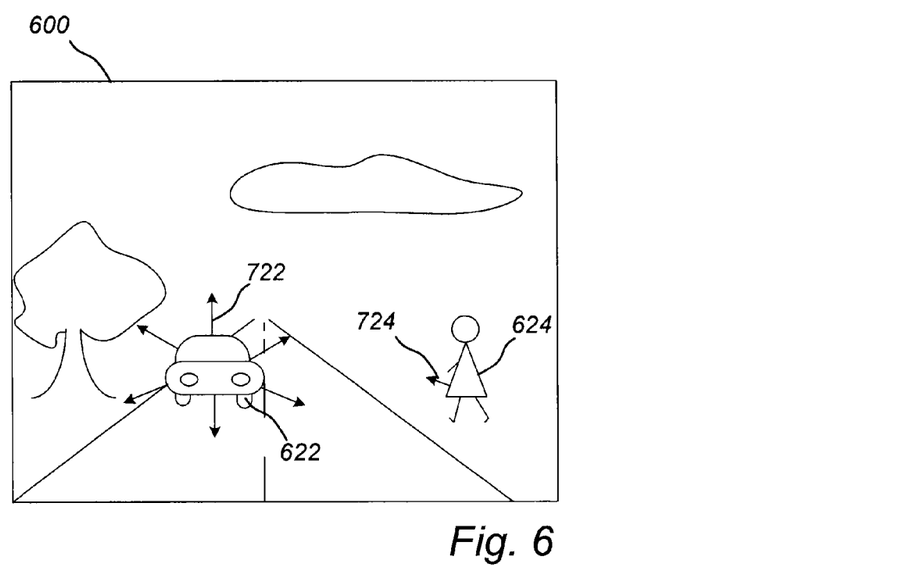
FIG. 6 is a schematic illustration of a video sequence of a scene comprising an object which moves towards the camera.

FIG. 6 shows a video sequence of images 600 of a scene which comprises moving objects 622, 624. In this case the moving object 622, which is a car, moves in the direction towards the camera 102. This is illustrated in FIG. 6 by the arrows 722 which indicate that the size of the moving object 622 in the video sequence 600 increases as it approaches the camera 102. The speed of growth of the moving object 622 is related to the speed of the object 622 towards the camera 102.

Figure 7:
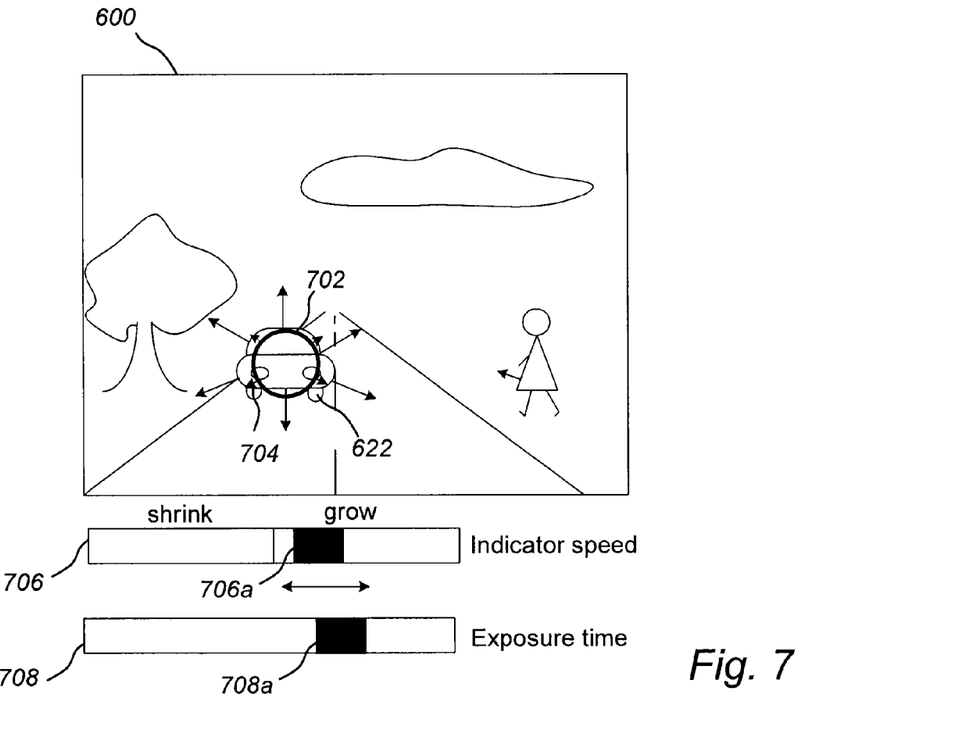
FIG. 7 shows the video sequence of FIG. 6 together with an overlaid moving indicator in accordance with embodiments.
Figure 8:
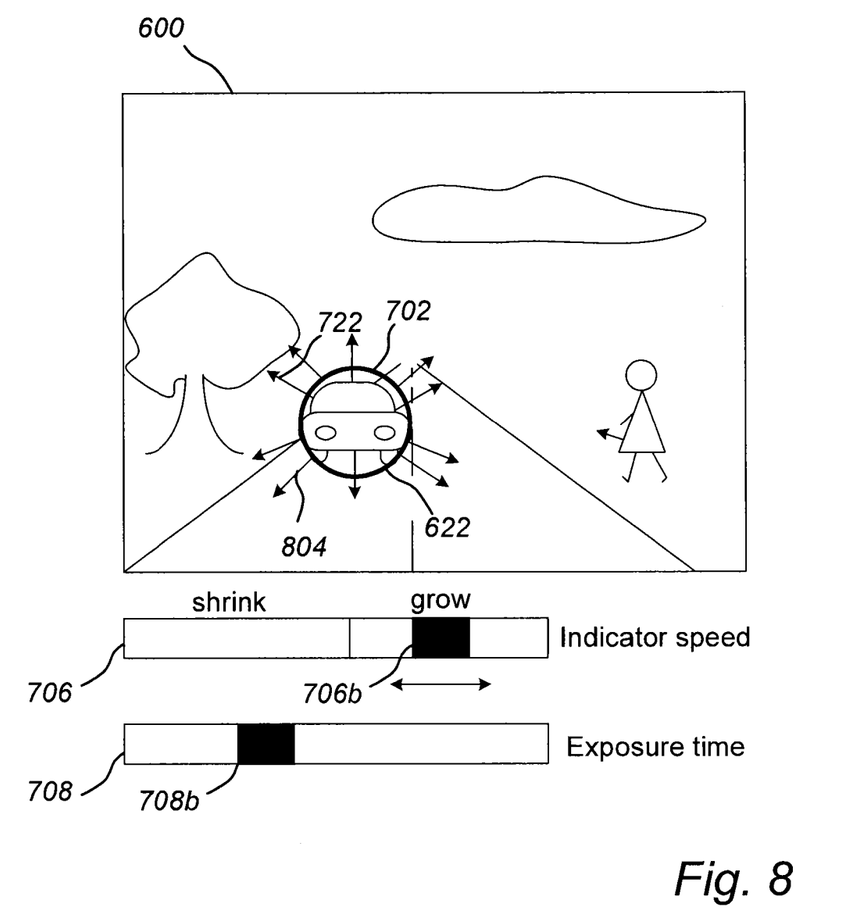
FIG. 8 shows the video sequence of FIG. 6 together with an overlaid moving indicator whose speed is adjusted in accordance with embodiments.

Similarly to the embodiment described with reference to FIGS. 2-5, the video sequence of images 600 may be received by the camera exposure time setting apparatus 104, and, as illustrated in FIG. 7, the processing unit 110 may overlay a moving indicator 702 (see FIG. 7) in the video sequence of images 600. In this embodiment the moving indicator 702 is a graphical object having a shape the dimensions of which change at a speed as illustrated by the arrows 704. Here the moving indicator 702 is in the form of a circle having an increasing radius, i.e. the circle is growing. In case the moving object 622 had been travelling away from the camera 102, the dimensions of the moving indicator 702 would instead be decreasing, i.e. the moving indicator would shrink. Similarly to the other embodiment disclosed above, the position of the moving indicator 702 may be adjusted. Also the initial dimensions of the moving indicator 702 may be adjusted.

The speed of growth/shrinkage of the moving indicator 704 is adjustable, for example by an operator via a slider 706 on the user interface of the display device 106. In particular the speed of growth/shrinkage of the moving indicator 704 may be matched to the speed of growth/shrinkage of the moving object 622. This is further illustrated in FIG. 8 wherein the speed of growth of the moving indicator 702 has been adjusted from a first speed 706a corresponding to a first exposure time 708a (see FIG. 7) to a second speed 706b corresponding to a second exposure time 708b. In FIG. 8 this is illustrated in that the arrows 804 representing the adjusted speed of the moving indicator 702 matches the speed of growth of the moving object 622 as represented by the arrows 722. In this way, the adjusted speed of change of the moving indicator 702 reflects the speed of the moving object 622. Hence, as discussed above, the processing unit 110 may find an exposure time corresponding to the adjusted speed of the moving indicator 702, for example by performing a table look-up, and base the setting of the camera exposure time thereupon.

It will be appreciated that a person skilled in the art can modify the above-described embodiments in many ways and still use the advantages of the invention as shown in the embodiments above. For example, other types of moving indicators, such as squares or rectangles, may be used. Also, several moving indicators, such as several lines or shapes which move across the image may be used. This would make it easy to see whether the moving object stays between two of the lines or shapes. Thus, the invention should not be limited to the shown embodiments but should only be defined by the appended claims. Additionally, as the skilled person understands, the shown embodiments may be combined.

The invention claimed is:

1. A method for setting a camera exposure time of a camera, comprising:

receiving a video sequence of images of a scene in which there is a moving object;

overlaying a moving indicator in the video sequence of images, wherein the speed of the moving indicator corresponds to an exposure time below which objects that move at an angular speed which is slower than the indicator will be imaged by the camera with a sharpness being above a certain sharpness level;

receiving an input to adjust the speed of the moving indicator such that it moves at the same speed as the moving object in the video sequence of images;

setting the camera exposure time based on the exposure time that corresponds to the speed of the moving indicator after the speed adjustment.

2. The method of claim 1, wherein there are a plurality of moving objects in the video sequence of images and the step of receiving an input to adjust the speed of the moving indicator comprises receiving an input to adjust the speed of the moving indicator such that it moves at the same speed as the fastest moving object in the video sequence of images.

3. The method of claim 1, wherein the position or orientation of the moving indicator is adjustable.

4. The method of claim 1, wherein the moving indicator is a line.

5. The method of claim 1, wherein the indicator is an object having a shape the dimensions of which changes at a speed which is adjustable.

6. The method of claim 5, wherein the indicator is a circle having a radius which changes at a speed which is adjustable.

7. The method of claim 1, wherein the step of setting the camera exposure time comprises setting the camera exposure time to be shorter or equal to the exposure time that corresponds to the speed of the moving indicator after the speed adjustment.

8. The method of claim 7, wherein the camera has a zoom functionality and the exposure time that corresponds to the speed of the moving indicator after the speed adjustment is associated with a first zoom level of the camera, further comprising setting the camera exposure time to the exposure time associated with the first zoom level, and zooming out to a second zoom level.

9. An apparatus for setting a camera exposure time, comprising:

a receiver configured to receive from the camera a video sequence of images of a scene in which there is a moving object;

a processing unit configured to overlay a moving indicator in the video sequence of images, wherein the speed of the moving indicator corresponds to an exposure time below which objects that move at an angular speed which is slower than the indicator will be imaged by the camera with a sharpness being above a certain sharpness level;

an input device configured to receive input regarding an adjustment of the speed of the moving indicator such that it moves at the same speed as the moving object in the video sequence of images;

wherein the processing unit is further configured to set the camera exposure time based on the exposure time that corresponds to the speed of the moving indicator after the speed adjustment.

10. A non-transitory computer-readable medium comprising computer code instructions which are adapted to perform the method of claim 1 when run in a device having processing capabilities.

* * * * *